United States Patent
Hibbs et al.

(10) Patent No.: US 10,012,752 B2
(45) Date of Patent: Jul. 3, 2018

(54) SYSTEM AND METHOD TO INDUCE AN ELECTROMAGNETIC FIELD WITHIN THE EARTH

(71) Applicant: GroundMetrics, Inc., San Diego, CA (US)

(72) Inventors: Andrew D Hibbs, La Jolla, CA (US); H Frank Morrison, Berkeley, CA (US)

(73) Assignee: GroundMetrics, Inc., San Diego, CA (US)

( * ) Notice: Subject to any disclaimer, the term of this patent is extended or adjusted under 35 U.S.C. 154(b) by 111 days.

(21) Appl. No.: 14/426,601

(22) PCT Filed: Sep. 5, 2013

(86) PCT No.: PCT/US2013/058158
§ 371 (c)(1),
(2) Date: Mar. 6, 2015

(87) PCT Pub. No.: WO2014/039618
PCT Pub. Date: Mar. 13, 2014

(65) Prior Publication Data
US 2015/0219784 A1    Aug. 6, 2015

Related U.S. Application Data

(60) Provisional application No. 61/698,226, filed on Sep. 7, 2012, provisional application No. 61/709,352, filed on Oct. 4, 2012.

(51) Int. Cl.
*G01V 3/00* (2006.01)
*G01V 3/26* (2006.01)
*G01V 3/24* (2006.01)

(52) U.S. Cl.
CPC . *G01V 3/26* (2013.01); *G01V 3/24* (2013.01)

(58) Field of Classification Search
CPC .................................................. G01V 3/18–3/28
USPC .................................................... 324/323–375
See application file for complete search history.

(56) References Cited

U.S. PATENT DOCUMENTS

| | | | | |
|---|---|---|---|---|
| 2,211,124 | A |   | 8/1940 | Jakosky |
| 2,273,363 | A | * | 2/1942 | Lipson ...................... G01V 3/24 |
| | | | | 324/368 |
| 2,364,957 | A | * | 12/1944 | Douglas ................ E21B 17/003 |
| | | | | 324/356 |
| 2,389,241 | A | * | 11/1945 | Silverman ................ G01V 3/24 |
| | | | | 324/347 |
| 3,831,138 | A | * | 8/1974 | Rammner ............... E21B 47/06 |
| | | | | 324/323 |

(Continued)

FOREIGN PATENT DOCUMENTS

| | | |
|---|---|---|
| EP | 2253971 | 11/2010 |
| GB | 2114752 | 8/1983 |
| WO | WO 2014/031175 | 2/2014 |

*Primary Examiner* — Patrick Assouad
*Assistant Examiner* — Demetrius Pretlow
(74) *Attorney, Agent, or Firm* — Diederiks & Whitelaw, PLC

(57) ABSTRACT

A system enables a borehole casing to be used to connection with establishing electromagnetic fields within the earth at the depth of formations of interest over a significant surface area. A particular advantage is that a borehole casing can be used as an essential part of the system, without needing to open the borehole.

17 Claims, 12 Drawing Sheets

(56) References Cited

U.S. PATENT DOCUMENTS

| | | | | |
|---|---|---|---|---|
| 3,975,735 A * | 8/1976 | McCullough | G01V 3/06 | 324/326 |
| 4,015,234 A * | 3/1977 | Krebs | E21B 41/0085 | 367/81 |
| 4,160,970 A * | 7/1979 | Nicolson | E21B 47/122 | 166/66 |
| 5,260,661 A * | 11/1993 | Vail, III | G01V 3/28 | 324/339 |
| 5,877,995 A * | 3/1999 | Thompson | G01V 1/003 | 324/323 |
| 6,208,265 B1 * | 3/2001 | Smith | G01V 3/12 | 340/853.1 |
| 7,151,377 B2 | 12/2006 | Chouzenoux et al. | | |
| 8,816,689 B2 * | 8/2014 | Colombo | G01V 3/26 | 324/328 |
| 9,069,097 B2 * | 6/2015 | Zhang | G01V 3/28 | |
| 2001/0030539 A1 * | 10/2001 | Montgomery | G01V 9/02 | 324/324 |
| 2004/0069514 A1 * | 4/2004 | Rodney | G01V 11/002 | 174/350 |
| 2005/0264295 A1 * | 12/2005 | Strack | G01V 3/24 | 324/375 |
| 2006/0028208 A1 * | 2/2006 | Strack | G01V 3/24 | 324/355 |
| 2006/0170424 A1 * | 8/2006 | Kasevich | E21B 43/24 | 324/338 |
| 2008/0061789 A1 * | 3/2008 | Coates | E21B 47/122 | 324/333 |
| 2010/0259267 A1 | 10/2010 | Rosthal et al. | | |
| 2012/0126816 A1 * | 5/2012 | Meekes | G01V 3/20 | 324/324 |
| 2014/0035589 A1 * | 2/2014 | Dell'Aversana | G01V 3/30 | 324/338 |

* cited by examiner

SYSTEM AND METHOD TO INDUCE AN ELECTROMAGNETIC FIELD WITHIN THE EARTH

CROSS-REFERENCE TO RELATED APPLICATIONS

This application represents a National Stage application of PCT/US2012/058158 entitled "System and Method to Induce and Electromagnetic Field Within the Earth" filed Sep. 5, 2013, which claims the benefit of both U.S. Provisional Patent Application No. 61/698,226 entitled "System and Method to Induce an Electromagnetic Field within the Earth", filed Sep. 7, 2012, and U.S. Provisional Patent Application No. 61/709,352 entitled "Continuation of System and Method to Induce an Electromagnetic Field within the Earth", filed Oct. 4, 2012.

BACKGROUND OF THE INVENTION

The present invention relates to a system and method for producing an electromagnetic (EM) field within the earth. More particularly, the invention relates to the generation of an electrical field at substantial depth and over substantial area using a cased borehole. The embodiments described herein relate generally to electromagnetic (EM) soundings within the earth based upon electric currents and the resulting electric and magnetic fields produced by those currents. As used herein, "earth" generally refers to any region in which a borehole may be located including, for example, the lithosphere.

EM geophysical soundings probe electrical resistivity in the earth as a function of depth. Typical targets of interest include ore bodies, hydrocarbons, water, proppants, hydraulic fracture (fracking) fluids, salts and other substances injected into the ground to improve the effectiveness of geophysical soundings as well as environmental pollutants. Since the resistivities of such targets and the surrounding medium may be quite dissimilar, it is possible to discriminate between them by means of measurement of their subsurface resistivity when subjected to an electromagnetic field. Using this methodology, the depth, thickness, and lateral extent of materials of interest may be determined.

The source of the EM field used in a geophysical sounding may originate in the natural environment, or be manmade. If manmade, the source is comprised of a transmitter and electrodes that make contact with the earth. The transmitter produces an oscillating voltage of the desired time-dependent waveform, which induces an electrical current to flow in the earth. Current is passed into the earth via a source electrode and returned to the transmitter via a counter electrode. However, the direction of current flow is in general oscillatory, and it is equally true to say the current flows into the ground from the counter electrodes and out via the source.

A current induced in the earth via a transmitter produces a primary magnetic field and also an electric field due to the electrical resistance of the ground. When oscillatory, these fields produce secondary EM fields. For example a time-varying magnetic field induces an electric field. The electrical properties of the earth and rate of change of the field determine the relative magnitudes of the secondary and primary fields. The combination of primary and secondary fields results in combined electromagnetic interaction with the earth even for a source intended to produce a solely electric or magnetic field.

While the majority of EM geophysical soundings are performed with an EM source on the surface of the earth, a borehole can provide physical access to the subsurface. Connecting a geophysical transmitter to the earth via a borehole provides a way to produce EM fields within the earth at desired depths without the attenuation and uncertainties that that may result if the source fields originate from a source at the surface of the earth.

Borehole sources to date fall into three categories: a) well logging, for which the source and receiver are located in the same borehole, b) cross well electromagnetic, and c) borehole-to-surface electromagnetic (BSEM). Borehole sources used for well logging are designed to produce an EM field in the immediate vicinity of the borehole, typically in the rock on the order of 1 m outside the borehole. Cross well EM sources produce an EM field that is measured in an adjacent borehole, up to approximately 1 km away. As implemented to date, cross well sources generate a magnetic field that is measured by a magnetic sensor in the adjacent well. In the BSEM method the source is within a borehole and an array of EM sensors is arranged at the ground surface. To date BSEM surveys have employed an electric field source and electric field sensors at the earth's surface.

FIG. 1 illustrates a known configuration wherein a borehole electric field source 2 comprised of an electrode 10, termed the source electrode, is positioned at depth within a borehole B of a well W, and an electrode 20 at the ground surface S is disposed near to the well and acts as a counter electrode. A transmitter 30 produces a voltage that induces an electric current to flow between the source 10 and counter 20 electrodes. Part of this current flows within the earth, where it generates EM fields that are characteristic of the electrical properties of the local earth medium.

The conventional configuration of a source electrode at depth in a borehole and a counter electrode at the top of the borehole is convenient to implement but has the disadvantage that the electric current largely flows in a vertical direction. Typical current paths, and the associated parallel electric fields, are indicated by lines in FIG. 1 for purposes of illustration. The paths are only shown on one side of the borehole but it should be understood to pass with approximately azimuthal symmetry all around the borehole. The precise path of the current depends on the electrical conductivity of the earth, which in general varies with both depth and azimuth about the borehole. However, regardless of the specific paths taken by the current, locating the counter electrode adjacent to the borehole minimizes the lateral projection of the current away from the borehole. As a result, the EM field that is generated in the earth decreases rapidly with increasing large lateral distance from the well.

One innovation to extend the lateral range of the BSEM configuration is to locate a number of counter electrodes 20' at a distance from the well W' in order of the depth of the source electrode 10', and at least not less than 10% of the borehole depth. This advance is described in the recently filed patent application PCT/US12/39010: System and Method to Measure or Generate an Electrical Field Downhole, by Hibbs and Glezer, and illustrated in FIG. 2. The current is forced to flow laterally through the ground (i.e., orthogonal to a vertical borehole) by a distance at least equal to the radial distance between the source and counter electrodes. This configuration can be termed a radially grounded source (RGS). Still, a potential disadvantage of the BSEM method concerns the need for the borehole to be opened and a wireline lowered to the source electrode at the desired depth. An additional potential concern about the BSEM configuration is the electrical voltage that is present on the casing.

In any case, given the known prior art, it is desired to improve on the known prior art arrangements, particularly avoiding the need to wire a source electrode arranged deep within a well.

SUMMARY OF THE INVENTION

In accordance with the invention, a well is defined in the earth, at least in part, by a borehole casing. Located along the earth's surface and spaced at significant lateral offset distances from the well are multiple electrodes. The electrodes are electrically linked to a transmitter which is also electrically connected to the borehole casing. The borehole casing is made of a conductive material such that the casing acts as an electrode within the well. With this arrangement, paths of electrical current P can be established within the earth, between the borehole casing and the multiple electrodes for the entire depth of the borehole casing. The system can be used for various purposes, including as part of a geophysical sounding arrangement, to determine subsurface resistivity, and to indicate a physical distribution of a wide range of fluids, solids and gaseous formations within the earth.

Additional objects, features and advantages of the invention will become more fully apparent from the following detailed description with reference to the accompanying drawings.

BRIEF DESCRIPTION OF THE DRAWINGS

FIGS. 4A and 4B sets forth a comparison of the current flow in the ground and along the casing for BSEM (FIG. 4A) and RDGC (FIG. 4B) source configurations, while

DETAILED DESCRIPTION OF THE INVENTION

Figure 3:
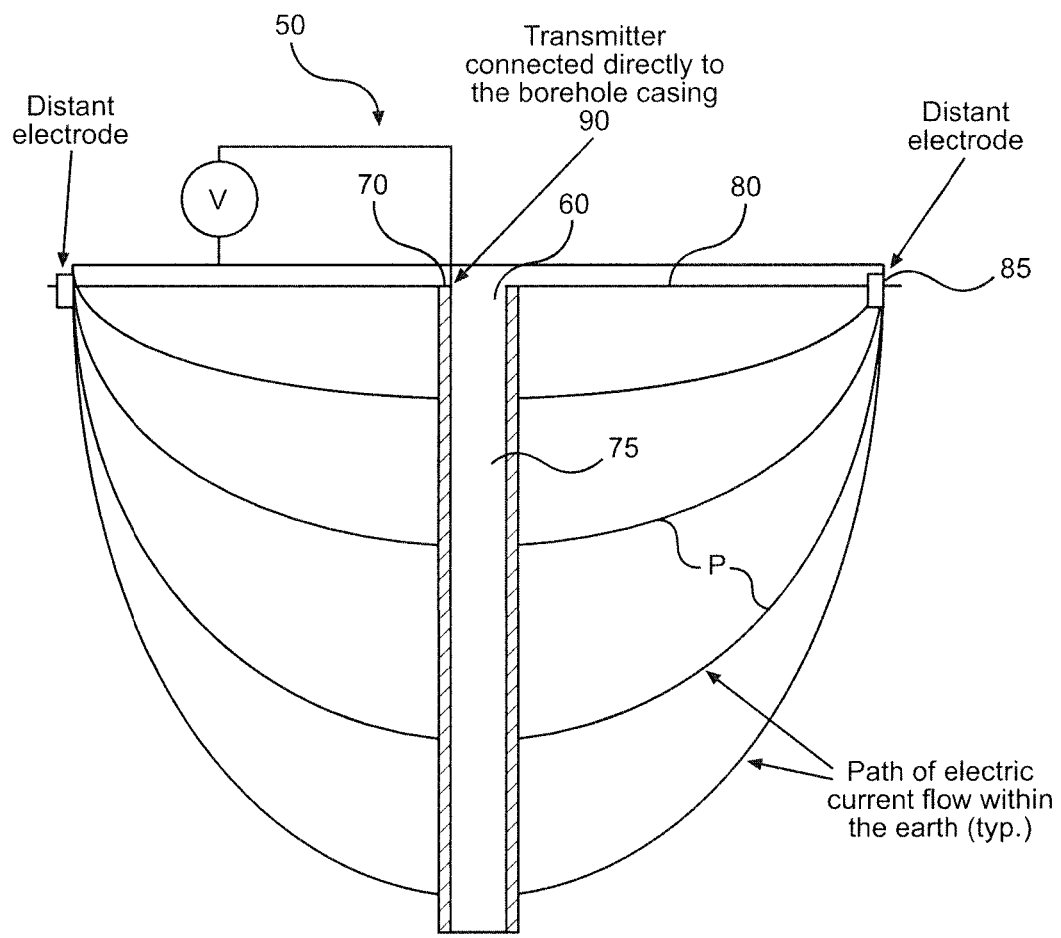
FIG. 3 illustrates a borehole source configuration constructed in accordance with the invention with a source electrode connection made at a top of the casing and counter electrodes being located at a significant lateral offset at the earth's surface.

As will become fully evident below, the invention, as represented in FIG. 3, sets forth a system 50 which specifically avoids using a source electrode within the bore at depth, but rather relies upon an entire casing 60 of a borehole 65 to establish multiple electric flow paths in the earth by providing an electrical connection at the top 70 of the casing 60. As shown, a well 75 is defined, at least in part, by the borehole casing 60. Located along the earth's surface 80 and spaced at significant lateral offset distances from the well 70 are a plurality of spaced electrodes 85. The electrodes 85, which can actually constitute either source or counter electrodes as will be discussed further below, are linked to a transmitter 90 which is also electrically connected to the borehole casing 60. The borehole casing 60 is made of a conductive material such that the casing 60 also acts as an electrode which extends to depth down the well 75. With this arrangement, paths of electrical current P can be established within the earth, between the borehole casing 60 and the plurality of electrodes 85 for the entire depth. At this point, it should be noted that the invention applies primarily to the BSEM configuration, although it can also be applied to cross well applications and could, if desired, be applied in well logging. Accordingly it is most relevant to describe the invention in comparison to the present BSEM practice. In addition, it should be recognized that the plurality of electrodes 85, constituted by at least two electrodes, are provided along or adjacent the earth's surface, with this "along" or "adjacent" terminology intended to cover both positioning the electrodes on the surface or burying the electrodes a relatively short distance, such as between 1 meter-20 meters and generally extending to sufficient depth to make adequate electrical contact with the water table, to establish a specific region or field of interest.

Figure 1:
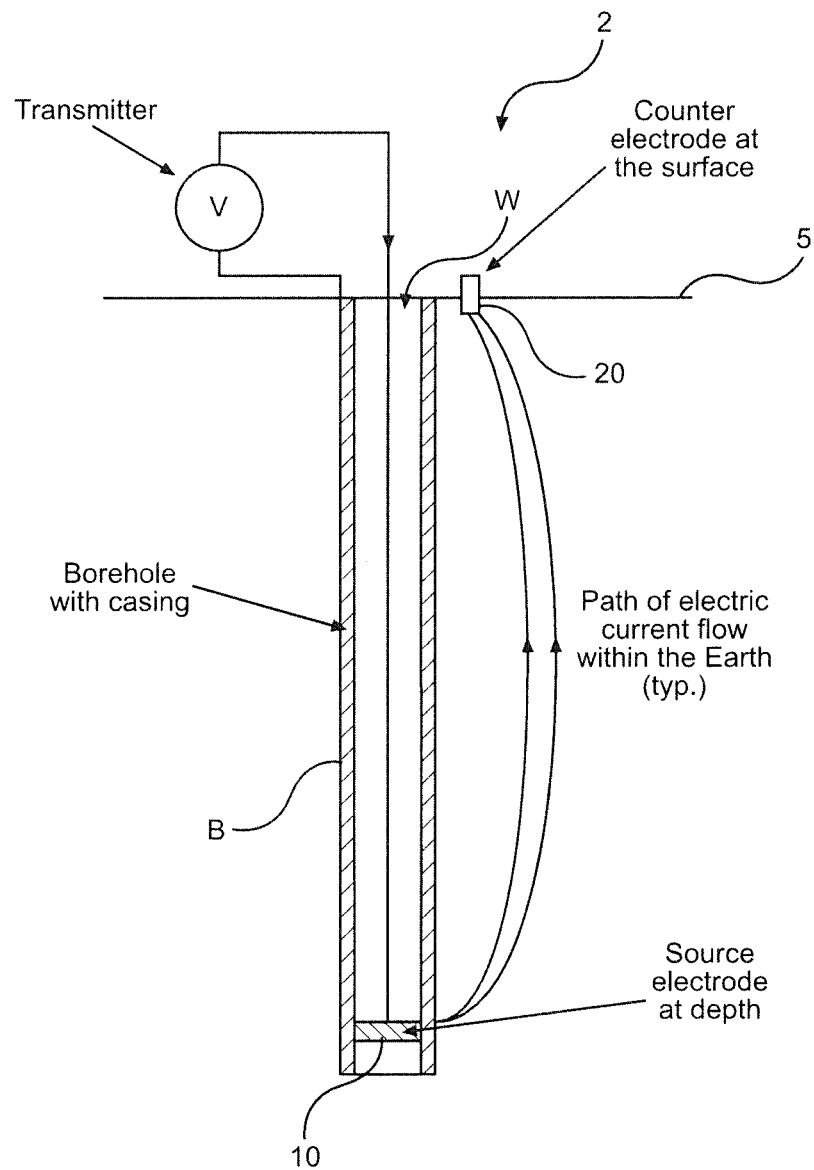
FIG. 1 illustrates a conventional BSEM configuration with a source electrode at depth within a borehole and counter electrode at the earth's surface adjacent to the borehole.
Figure 2:
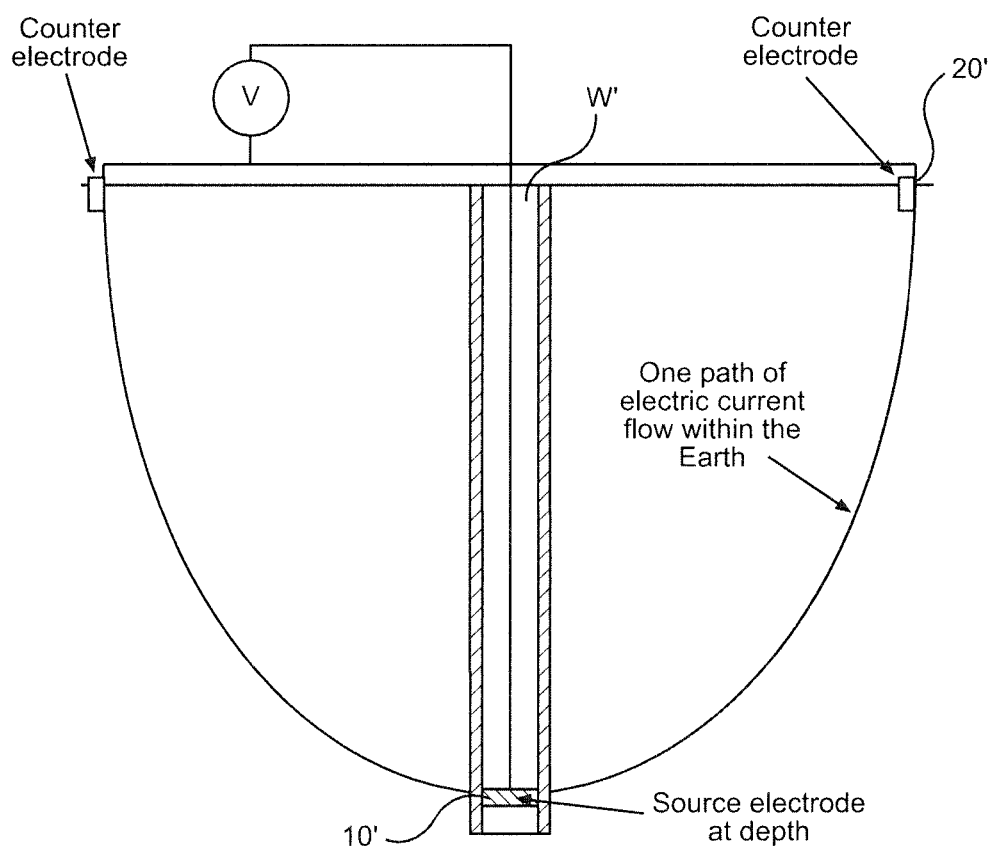
FIG. 2 presents a known Radially Grounded Source (RGS) configuration comprised of a source electrode at depth within a borehole and two or more counter electrodes located at a significant lateral offset at the earth's surface.

Certainly, there are various potential ways to energize the system. If the configuration shown in FIG. 3 were energized in an analogous manner to that of a conventional BSEM source (FIG. 1) or RGC (FIG. 2), the power that is applied to the lower electrode in a BSEM or RGC would instead be applied to the casing. However, although straightforward to implement, such an arrangement would place the maximum electric voltage at the top of the casing. Energizing the casing at the full voltage at the ground surface would require a safe perimeter be established around the well. Moreover, in the event the casing is part of an operating well, it will be connected to other infrastructure, such as pipes. The casing voltage will be applied also to this infrastructure resulting in further issues, such as the electrical current flowing in the connected conductors and dissipating considerable power from the transmitter. Accordingly, if the top of the casing is energized, disconnecting and electrically isolating the casing from its normally associated infrastructure is preferably employed.

One method to mitigate the problem of energizing the top of the casing is to connect to the casing not at full depth, but at a moderate stand-off from the surface and then ground the top of the casing. For example, a connection can be made at 100 m depth to a casing that extends from the surface to 2000 m and the top of the casing grounded (i.e., held at 0 volts), resulting in approximately 5% of the current flowing down the casing from the connection point and 95% flowing upwards to the surface. However, although viable, this approach requires considerably more power to be applied to the casing than would otherwise be needed.

Figure 4A:
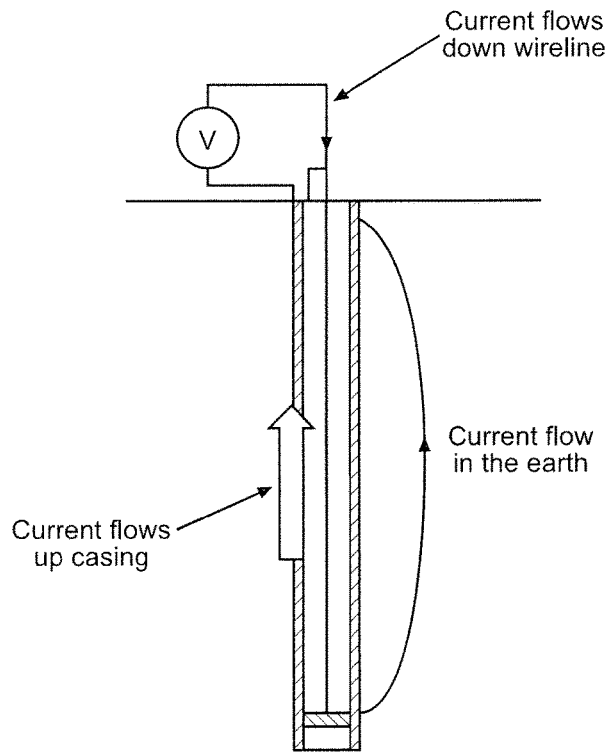
Figure 4B:
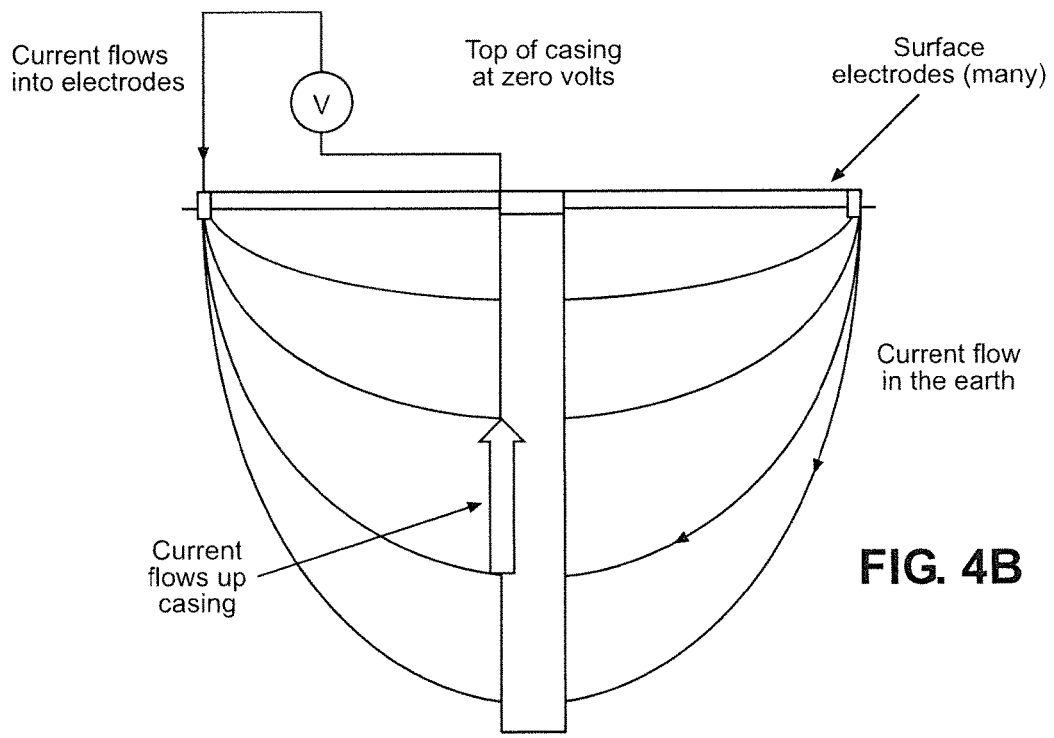

A more preferred approach is to instead energize one or more of the electrodes 85 and hold the top of the casing at close to zero volts, an arrangement which can be termed the Radially Driven Grounded Casing (RDGC). In the RDGC the amplitude of the voltage applied to the earth is maximum at the electrodes 85, whereas in conventional BSEM the voltage is maximum at the bottom of the borehole. Accordingly, given that they are now the high voltage points of the circuit, we rename the "counter electrodes" to be the "source electrodes" (note this arrangement would establish these electrodes as source electrodes versus counter electrodes in this embodiment, although because an AC current is preferably employed this a matter of semantics). For the RDGC, the current flow in the casing and voltage on the casing are very similar to the conventional BSEM case as shown in FIG. 4. As a result in the RDGC, the maximum voltage amplitude on the casing is always less than for conventional BSEM. Indeed given that the electrical resistivity of the subsurface is much higher than the casing, the maximum voltage amplitude that appears anywhere on the casing due to an RDGC source can be considerably less than for conventional BSEM.

The easiest way to connect the transmitter to the casing is to simply connect a cable from the transmitter directly to the top of the casing. However it is not necessary that a direct physical contact be made, only that the electrical resistance between the transmitter and casing be small compared to the total electrical resistance of the path from the transmitter to the source electrodes and through the earth to the casing. Thus the casing to transmitter circuit could be completed by emplacing one or more shallow electrodes in the ground in the vicinity of the casing and connecting these directly to the cable that connects to the transmitter. Current passes from these shallow electrodes indirectly to the upper region of the casing via the earth, or vise-versa. This approach could be particularly advantageous in situations where the casing is not immediately accessible at the surface. Given that the source electrodes will generally be 1 km or more from the casing, the electrodes used to couple into the top of the casing could be a moderate distance from the casing (e.g., 50 m) depending on the maximum allowable voltage. In contrast the source electrodes are located at a radial distance from the borehole of greater than 0.2 times the maximum depth of the casing, which is typically greater than 200 m.

Furthermore, although it is simplest to contact the casing directly, it is not necessary and electrical contact can be made to the casing through any electrical conductor of sufficient size that makes contact to the casing, for example a pipeline connected to the casing, or any well completion infrastructure.

Figure 4C:
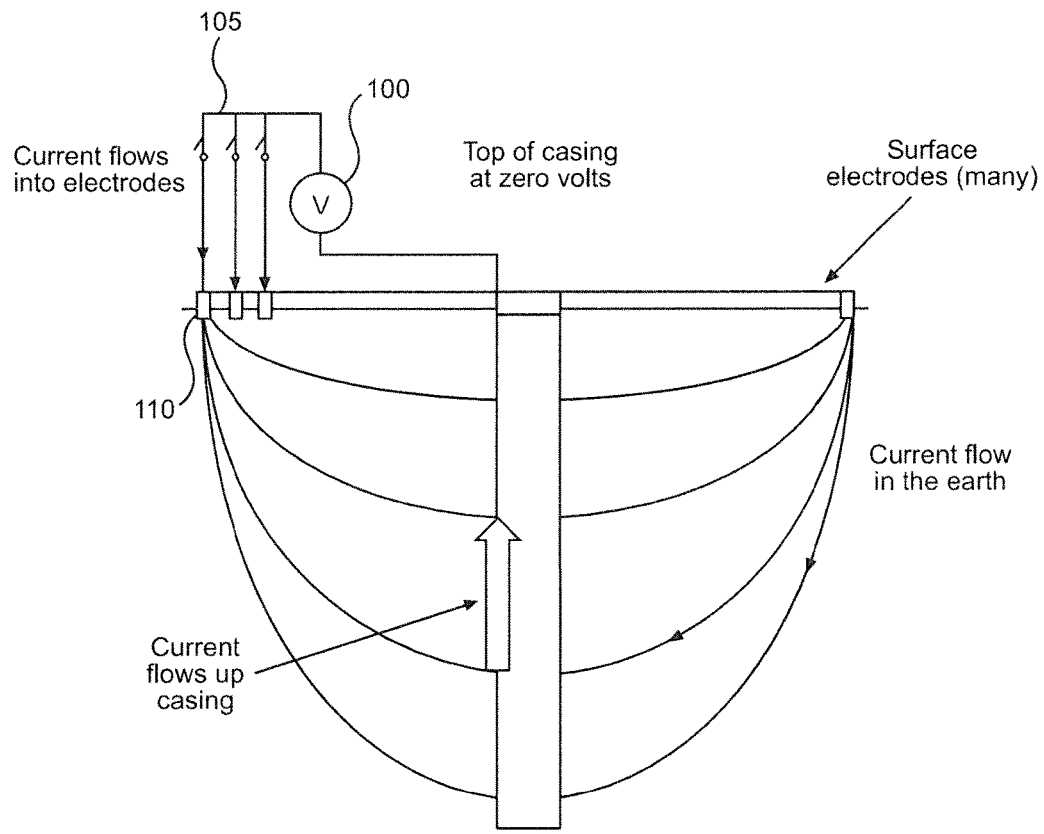
FIG. 4C shows source electrodes set at different distances from the casing.

For conventional BSEM and RGC, the casing is energized from a deep location, approximately where the source is positioned, whereas for RDGC the source electrodes are at the ground surface. It might appear from FIGS. 3 and 4 that the RDGC configuration results in only a small fraction of the electrical current being injected into the earth at a considerable depth. However, in all three configurations, the borehole casing is a significant path for current flow, and calculations show that a comparable amount of current is injected into the earth at depth regardless of where the high voltage output of the transmitter is connected. Indeed, an advantage of the RDGC is that source contact to the earth is at a reliably known depth (~0 m), whereas for conventional BSEM and RGS electrical current flows from the internal source electrode and well casing over a range of depths that depends on the conductivity of the internal borehole fluid. FIG. 4C shows an embodiment wherein an output of the transmitter 100 is switched at 105 between the electrodes 110 at different distances from the casing in order to change an effective depth of the casing. The source electrode can be repositioned at different depths for the RGC configuration, but for the RDGC source there is no electrode inside the borehole. However the effect of changing the depth of a source electrode can be reproduced by changing the radial distance of the counter electrodes from the casing.

Figure 5:
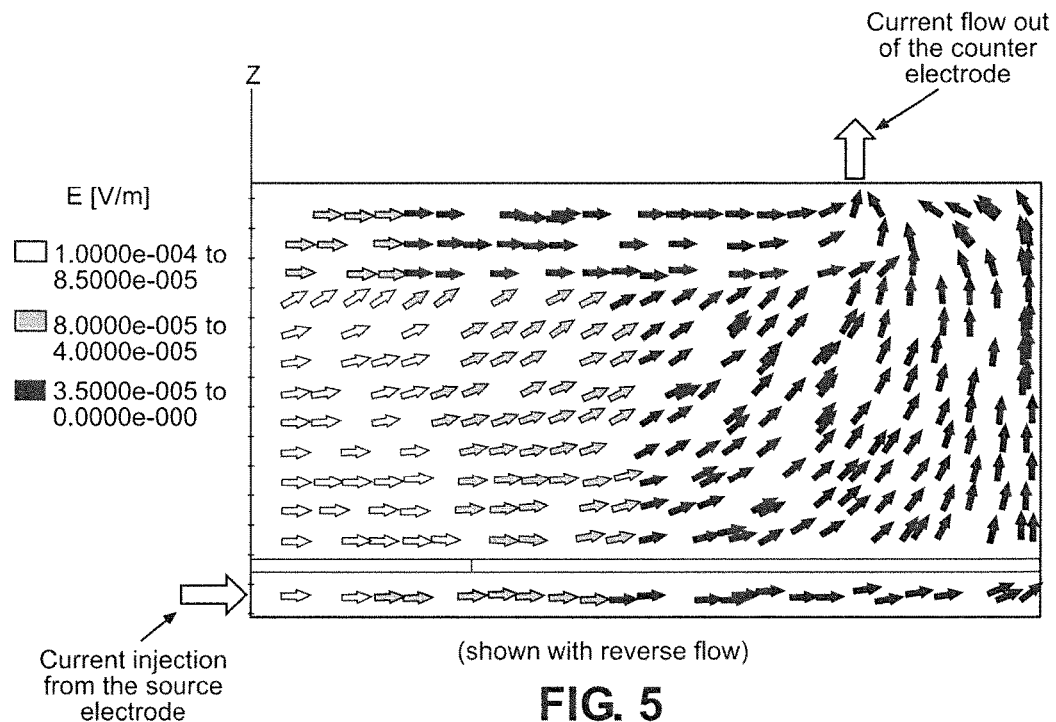
FIG. 5 illustrates a distribution of electric field lines within the earth for a source electrode in contact with the inside of a steel-cased borehole in the RGC configuration.
Figure 6:
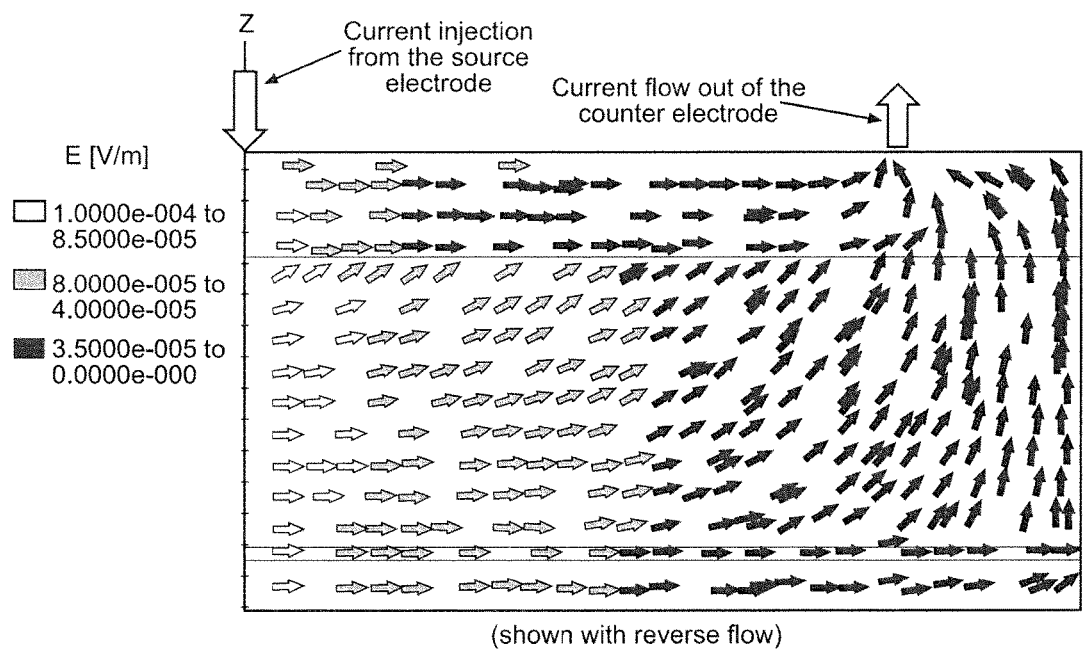
FIG. 6 sets forth a distribution of electric field lines within the earth for an electrical return connection at the top of a steel-cased borehole (RDGC configuration), with the electrode contact to the casing being indicated by the upwards arrow.

A comparison of current flow within the earth between the RGC and RDGC is shown in FIGS. 5 and 6. The earth is modeled as an upper layer 500 m thick of resistivity 14 $\Omega$m, a second layer 1400 m thick of resistivity 125 $\Omega$m, a hydrocarbon layer 50 m thick of resistivity 30 $\Omega$m and a lower level 200 m thick of resistivity 100 $\Omega$m. A borehole with steel casing extends down to 2200 m and a ring-shaped counter electrode is placed at the surface at a radial distance of 3000 m from the well. In a particularly preferred form of the FIG. 5 arrangement, the source electrode contacts the casing at a depth of 2000 m, as indicated by the horizontal red arrow. A ring counter electrode, depicted by a vertical red arrow, is located on the surface at a radial distance of 3000 m. FIG. 5 shows the cross section distribution of electric field lines within the earth for the case of an RDC source electrode in contact with the inside of the casing at a depth of 2000 m so that all electric current is injected into the casing at that depth. The electric field is parallel to the electric current and so FIG. 5 (and FIG. 6) also shows the distribution of the electric current. In this calculation, the electric field is predominantly orthogonal to the axis of the borehole out to a radial distance of order 2500 m, in keeping with the innovation of the RGC configuration.

FIG. 6 shows an equivalent calculation of the cross section distribution of electric field lines within the earth as in FIG. 5, but for the case of an electrical connection at the top of the casing, i.e., at a depth of 0 m, while the ring source electrode, depicted by a vertical arrow, is relatively located on the surface at a radial distance of 3000 m in the overall exemplary embodiment. Even though the second and lower layers of ground in the model have higher resistivity than the upper layer, a substantial electric field is present at depth >1000 m. Contrary to the present expectation in BSEM surveys, in the RDGC configuration electrical current flows down the casing and passes into the surrounding earth in significant quantity at significant depth, in fact all the way to the bottom of the casing. Thus, when combined with source electrodes at significant lateral offset, the RDGC approach allows current to be injected deep within the earth via a borehole casing, without inserting an electrode at depth inside the casing.

In FIG. 6 it is clear that the subsurface current travels the lateral distance from the source electrodes to the casing, but also flows in the region outside the perimeter defined by the ring of source electrodes. For example, even at the lowest layer of the model, the current flow continues outside the 3000 m radius defined by the source electrode, and out to the very edge of the model. Similarly, the current flow extends below the deepest point defined by the casing. This latter property is true for the RGC configuration, and, to a lesser extent, also for conventional BSEM. As a result, although the volume of the BSEM survey is most easily defined by the depth of the casing and the area enclosed by the counter electrode, it is not limited to that specific region. Accordingly, to perform a RDGC survey at a specific depth, it is not essential to have a casing or other conductor that extends fully to that depth.

Figure 7:
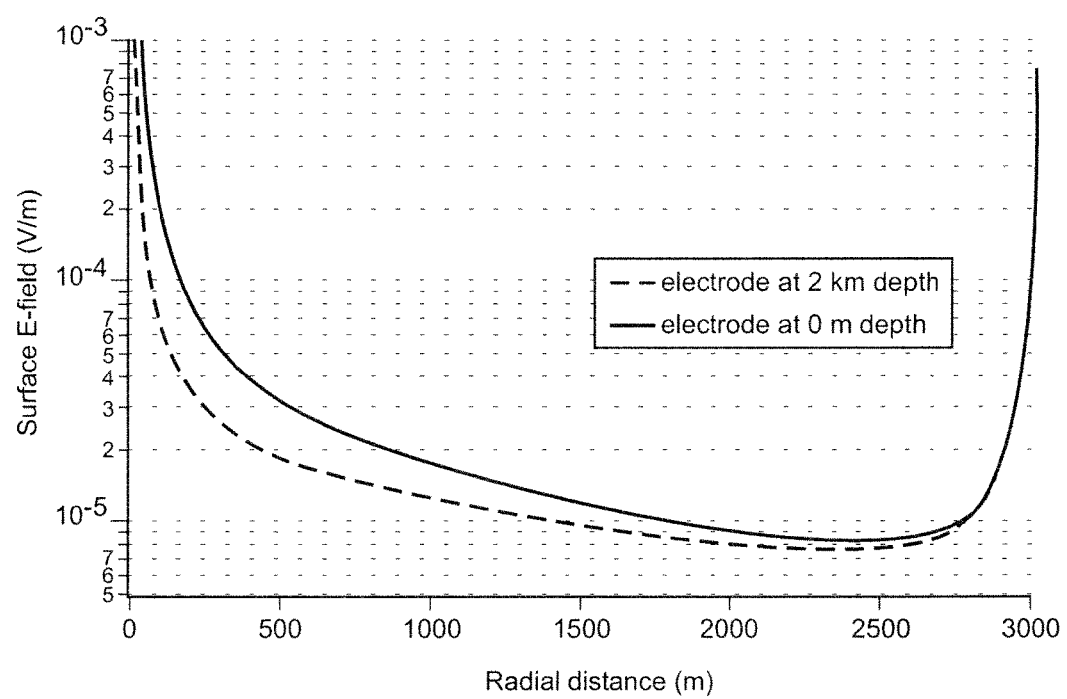
FIG. 7 sets forth a variation in the magnitude of the horizontal electric field at the ground surface for a source electrode in contact with a borehole casing at 2000 m depth and one at the ground surface (0 m) as a function of radial distance, r, from the borehole.

In a BSEM survey the horizontal electric field is measured at the earth's surface. In one interpretation, the relationship between the frequency components of the surface electric field can be related to the presence of hydrocarbons in the subsurface. In another the distribution of electric field measured at the surface can be inverted to give a three-dimensional model of the electrical resistivity of the subsurface, which in turn can be related to the distribution of typical targets such hydrocarbons and other resources of economic value. In both cases, the primary parameter of interest is the magnitude of the surface electric field, Es. FIG. 7 compares Es for a source electrode in contact with a borehole casing at 2000 m depth (RGC) and at a contact at the ground surface (RDGC) as a function of radial distance, r, from the borehole. Near to the borehole (r<500 m), Es for the RDGC is 2× or more higher, which is to be expected because the voltage on the casing at its upper end is higher when excited from the top. Further from the borehole (R>500 m) Es for the RGC and RDGC sources becomes almost identical.

Figure 8:
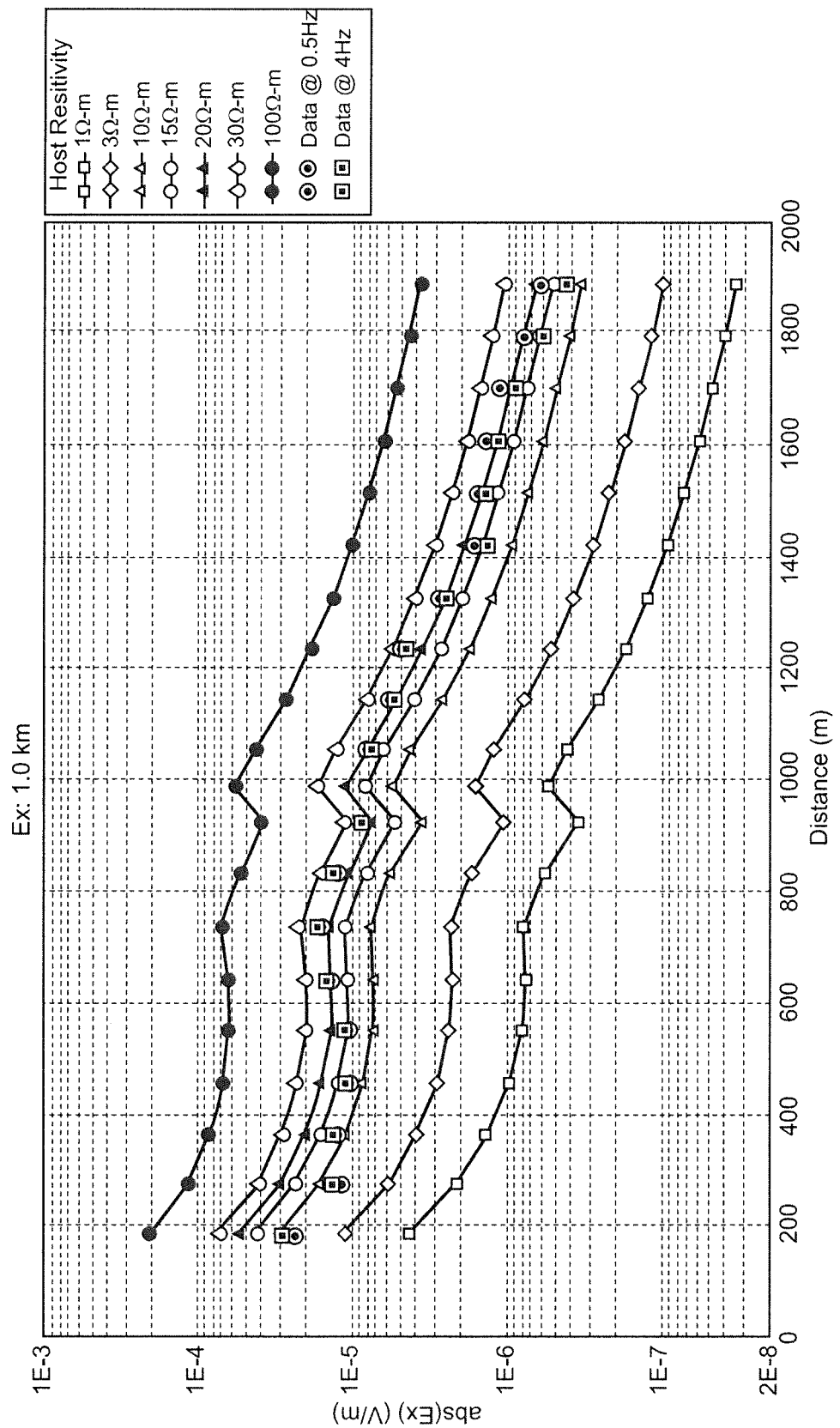
FIG. 8 illustrates measured surface electric field produced by an RDGC source comprised of five individual electrodes distributed on a quarter circle arc.
Figure 9A:
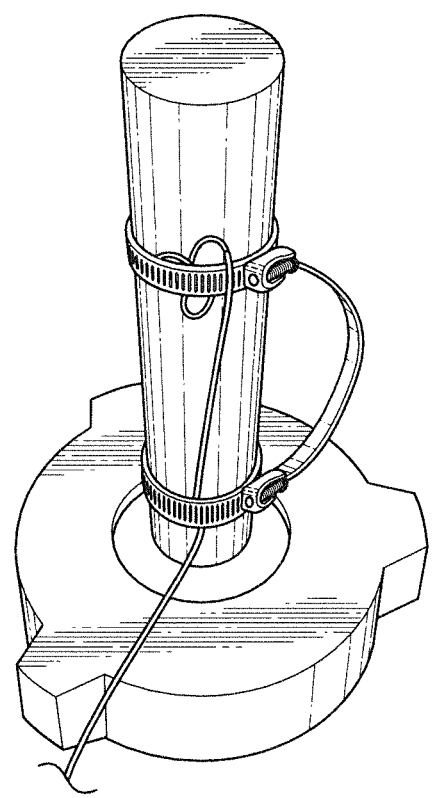
FIGS. 9A and 9B show the RDGC source used to acquire the data in FIG. 8, with FIG. 9A illustrating the electrical contact at the top of the well casing and FIG. 9B presenting one of the five source electrodes enclosed by a protective fence.
Figure 9B:
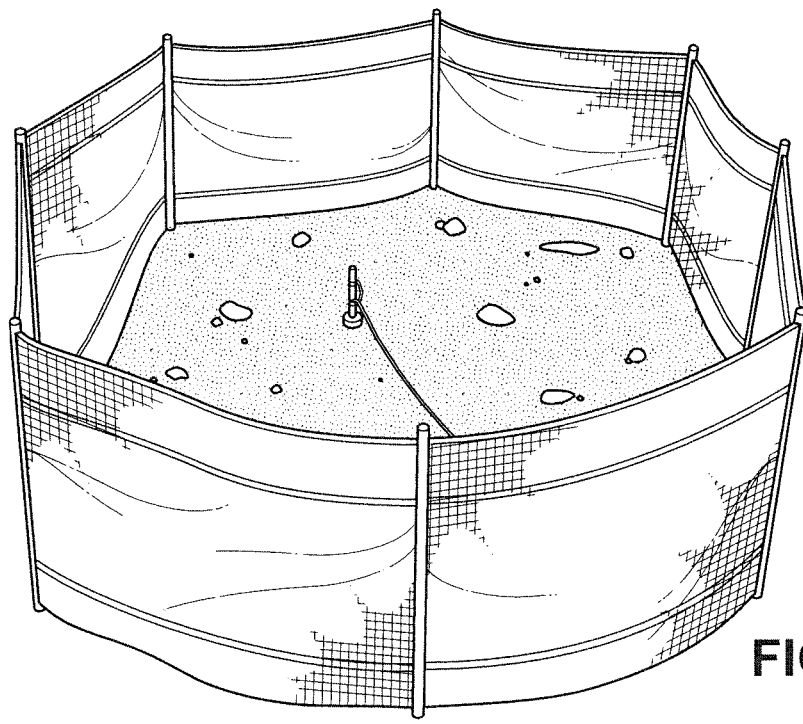

FIGS. 5-7 illustrate the electric fields resulting from a single continuous ring of source electrodes centered, or approximately centered, on the borehole. Substantially the same propagation of the subsurface and surface electric fields can be obtained by implementing the ring source electrode as a number of discrete isolated counter electrodes. Further, it is not necessary to implement the source electrodes in a ring per se; a portion of a ring can be used, or in fact any distribution of source electrodes provided they are a sufficient distance from the well. FIG. 8 shows the surface field produced by a quadrant of five source electrodes, located on an approximately circular arc of radius 1 km that subtended a 90 degree angle to the well (i.e., an approximate quarter circle). The well was steel cased with a depth of 860 m. The simple metal to metal contact used to make electrical connection at the top of the well and one of the source electrodes are shown in FIG. 9. Data in FIG. 8 are shown for a square wave generated with fundamental frequencies of 0.5 Hz and 4 Hz, and are scaled to a 1 A total current. The data are compared to an analytic model that assumes the earth has a uniform isotropic conductivity of the values shown in FIG. 8. The referenced data is the magnitude of the horizontal electric field at the ground surface in a direction radial to the well, while the solid lines are calculated surface field for an analytic model that assumes uniform earth resistivity.

FIG. 8 illustrates certain key aspects of the invention. Firstly, the surface field at 1 km radial distance is only reduced by a factor of 4 from that at 200 m and is easily measurable by geophysical recording equipment. Secondly the field outside the radius of the source electrodes is still easily measurable (0.5 µV/m) at 1900 m (i.e., almost twice the radial distance of the source electrodes from the well).

Figure 10:
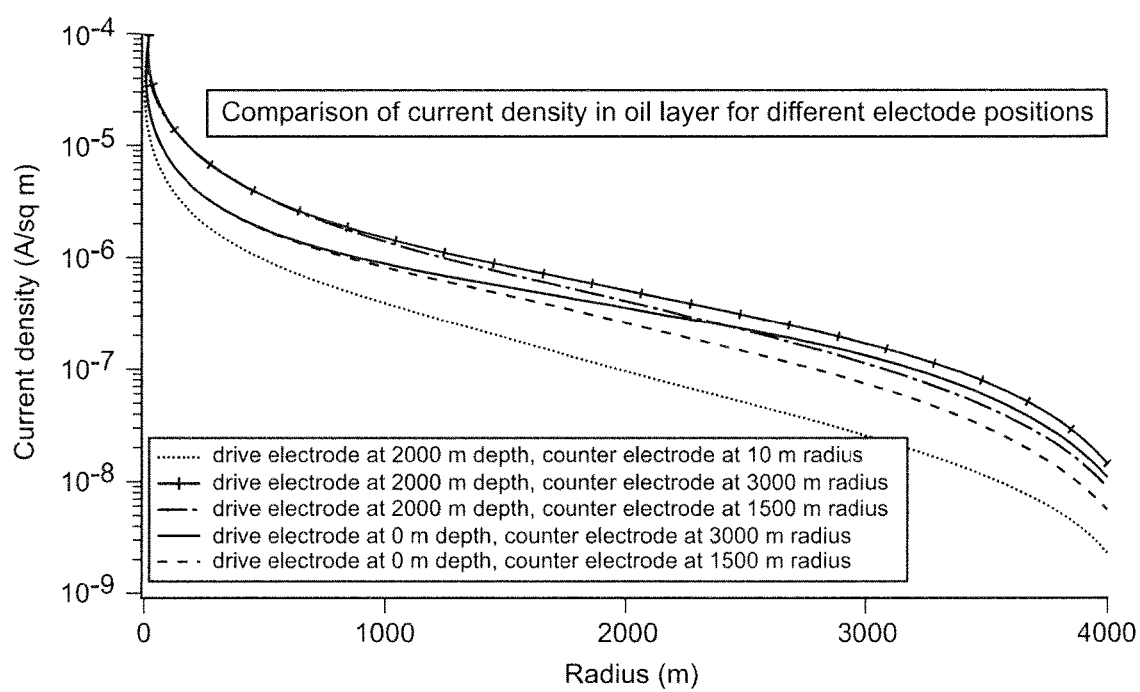
FIG. 10 sets forth subsurface electric current density in a horizontal plane at depth 1950 m for conventional BSEM, RGC, and RDGC source configurations.

The most important property of a source for BSEM is the capability to induce EM fields at the desired depth. FIG. 10 compares the electric current density in a horizontal plane at depth 1950 m for a casing that extends from the surface to 2000 m depth for the three cases of a conventional BSEM, RGC, and RDGC configurations. For the RGC and RDGC configurations the subsurface current for counter electrode ring of radii 1500 m and 3000 m are shown. FIG. 10 illustrates the three main properties of the BCSEM source configuration:

1. The fields induced in the earth extend well beyond the perimeter defined by the surface electrodes. For the RDGC configuration with counter electrodes at a 1500 m radius (blue dash line), the subsurface current at 1950 m depth decreases by only a factor of four between 1500 m radial distance and 2500 m radial distance from the well.
2. For all radial distances shown in FIG. 10, the subsurface current at 1950 m depth produced by the RDGC source is within a factor of two of the field produced by the RGC. The factor of two applies for surface counter electrodes at 1500 m and 3000 m distance from the well.
3. For all radial distances shown in FIG. 10 the subsurface current produced by the RGC and RDGC source configurations is substantially greater than the conventional BSEM source configuration.

Figure 11:
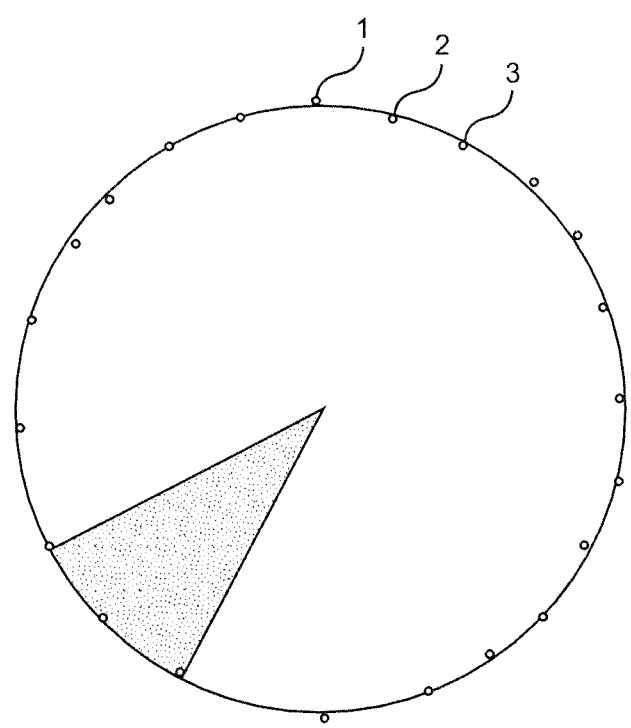
FIG. 11 is a plan view of a RDGC source configuration, wherein the well casing is the ring near the circle center, multiple discrete source electrodes (outer points on the circle) are arranged at approximately constant radial distance and angularly separated around the borehole, and the source electrodes can be individually excited to produce a subsurface field that is localized to a specific region (shaded segment).

As illustrated in FIG. 11, subsurface electrical current of significant magnitude may be generated at lateral distance two or more times the radius of a source electrode ring. The sensors utilized as part of a RDGC survey can thus be deployed over the approximate enclosed surface area defined by the source electrodes, including outside, within a reasonable distance, of the region enclosed by the source electrodes. In particular there is an economic benefit to reducing the number of source electrodes and the distance over which they are deployed, and so the invention may employ some sensors outside the perimeter defined by the source electrodes.

One beneficial capability of the conventional BSEM configuration is that the depth of the source electrode disposed in the borehole can be varied. Typically, a BSEM survey is conducted first with the borehole electrode at a depth a few meters below the lower boundary of the formation of interest, and then repeated with the electrode a few meters above the upper boundary of the formation. The signal characteristic of the formation can be emphasized relative to resistivity features at shallower depths by taking the difference of surface data recorded for the source electrode at the two depths (see First Borehole to Surface Electromagnetic Survey in KSA: Reservoir Mapping and Monitoring at a New Scale, Alberto F. Marsala, Muhammad Al-Buali, Zaki Ali and Shouxiang Mark Ma/Saudi Aramco Zhanxiang He, Tang Biyan, Guo Zhao and Tiezhi He/BGP CNPC presented at the SPE Annual Technical Conference and Exhibition held in Denver, Colo., USA, 30 Oct.-2 Nov. 2011 which is incorporated herein by reference). The source electrode can be repositioned at different depths for the RGC configuration, but for the RDGC source there is no electrode inside the borehole. However the effect of changing the depth of a source electrode can be reproduced by changing the radial distance of the counter electrodes from the casing. For a well casing that is short compared to the radial distance to the source electrodes, effect on depth can be approximated by a formula. For the specific case of a central electrode surrounded by a circular ring of counter electrodes at radius b, the equivalent depth, d, of a conventional dipole of moment p is given by Equation 1, where I is the total current flowing to the ring of electrodes.

$$d = \frac{Ib^2}{4p} \qquad 1$$

FIG. 11 illustrates a configuration of multiple source electrodes disposed in a ring centered about a borehole. Generally, the source electrodes will be metal rods or plates placed 1 m to 5 m deep in the earth using methods know to those familiar with the art. If desired, the position of each individual source electrode may be selected based on a model of the ground conductivity in the vicinity of the borehole in order to produce a desired distribution of electrical field within the ground. That is, as illustrated, the multiple electrode configuration as disclosed can be employed to focus on a specific region or field of interest, here shown to be an arcuate segmented area associated with the electrode-established ring. In addition, it is not necessary that the source electrodes be equally spaced or form a continuous path that surrounds the borehole. Furthermore, individual source electrodes can be selectively used, for example by closing a switch, while other source electrodes are unused, for example by opening a switch, in order to focus the field within the ground in a desired azimuthal direction. If desired, individual source electrodes or groups of source electrodes can be activated serially in time to produce an electrical field in the ground that rotates or otherwise changes its azimuthal distribution around the borehole.

Furthermore, it is within the scope of the invention to use a small number of source electrodes, including down to a single source electrode, and redeploy them throughout the survey so that over the course of the survey they eventually cover the complete source array distribution that is desired. For example with reference to FIG. 11, a single source electrode could be positioned at location 1 and the desired current waveform applied to it and returning back through the earth and the casing to the transmitter. The single source electrode can then be removed and deployed to position 2, and the current reapplied returning via the casing. This process can continue, for example to position 3, until the electrode has been deployed at all locations in the source array. However, even though a single source electrode can in principle be used via a method of repeated deployment, a minimum of two source electrode positions must be used to provide the surface area coverage envisioned by the invention.

Regardless of the location of the source electrodes, one or more individual source electrodes may be permanently electrically connected together so that they function as a single, distributed source electrode. Furthermore, although they are depicted at or near the earth's surface throughout this application, the source electrodes can be located at depth within the earth, and one or more source electrodes can be the casings of other boreholes.

For convenience, the borehole has been depicted in all diagrams and schematic figures as being straight and completely vertical. However, the invention is not restricted to either straight or vertical boreholes, but can be implemented in any configured borehole. The specific geometry of the borehole can be accommodated in an inversion model used to relate the surface fields, Es, to the subsurface resistivity distribution. For time-lapse monitoring wherein only changes in the surface fields over time are of interest, the specific borehole geometry may not matter provided it does not change.

Figure 12:
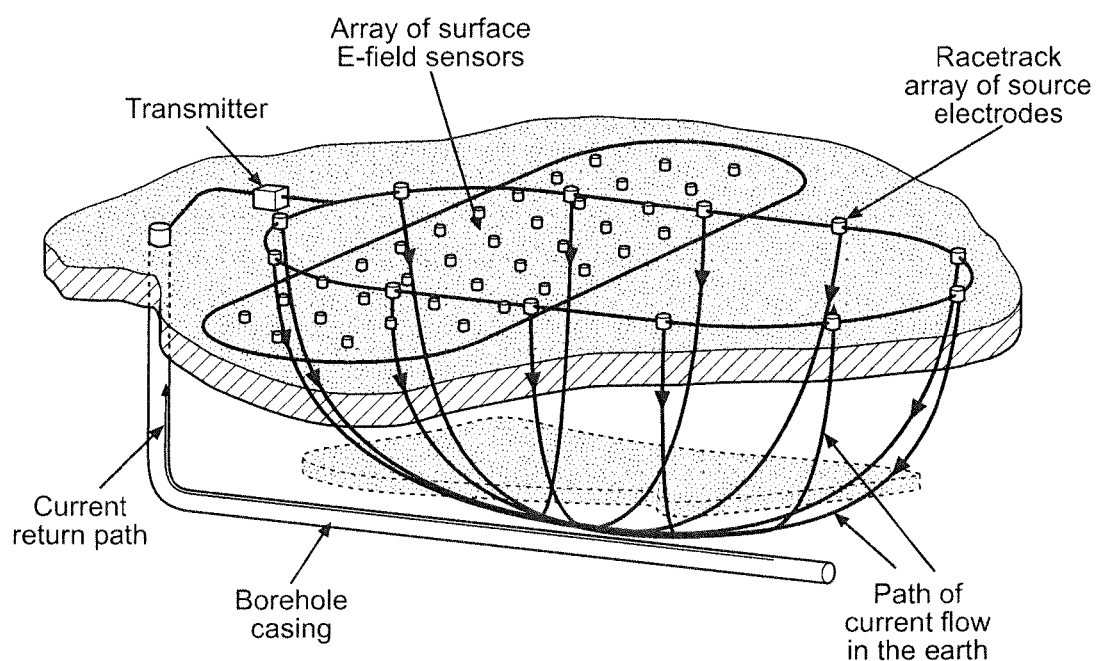
FIG. 12 is a schematic of the RDGC invention for use with a horizontal well, wherein a transmitter induces electrical currents to flow from a racetrack array of surface electrodes into the ground in the directions shown by the arrows down to the depth of the casing, with the current paths in the ground being mapped by a 2-D array of electric field sensors.

A specific example of great practical relevance is a horizontal borehole. FIG. 12 shows an arrangement of an RDGC for a horizontal casing. Current flows into the earth from an approximate ring of source electrodes at the surface that is approximately centered on the formation region of interest. The current flows to the horizontal section of the well casing depth and back up the vertical section of the casing to the earth's surface. An array of surface receivers or electromagnetic sensors records the horizontal electric field at the surface to deduce the distribution of electric current within the Earth.

Similarly, although it is of great practical and economic convenience to use the casing of a borehole, the casing is really a long electrical conductor that is in electrical contact with the earth to significant depths, and is able to carry a sufficient amount of electrical current to perform the RDCG survey. It is not necessary that this long electrical conductor comprise or be part of a functioning borehole casing. For example the long conductor could be production tubing inside a cased or uncased well, or be a solid rod inserted into an uncased borehole, or a conducting fluid that fills an uncased borehole, or be a solid rod bored or driven directly into the earth. The long conductor could also be comprised of several elements in series provided they are in electrical connection, such as a conducting borehole casing at its upper end and a conducting fluid in a lower, uncased, region of the borehole. For convenience the term "long conductor" is used generally herein, however, in the most preferred forms of the invention, it constitutes a return conductor.

Further, although the invention has been depicted with only a single borehole, it is within the scope of the invention to use different return conductors as the current return path, e.g. strips, portions or attachments of a casing. These conductors will not in general be in the approximate center of the source electrode distribution but will be close enough to the source electrodes that adequate subsurface current flows at the depth of interest. In some surveys, the source electrodes may be distributed to utilize two or more return conductors approximately equally. The use of two or more return conductors allows multiple spatial views of the formation, thereby reducing the uncertainty in the final subsurface resistivity image produced by the survey.

The current produced by the RDGC may be DC (static) or AC (oscillatory). When DC, the output waveform is simply a fixed value output when the transmitter is activated. When AC, any waveform may be used, though generally in a geophysical sounding aimed to probe the earth at significant depth, waves with a fundamental frequency between 0.01 Hz and 100 Hz are used, and more preferably in the range 0.1 Hz to 10 Hz.

When an oscillating current waveform is provided by the transmitter the question of which part of the system is the source of the current and which is the return path arises. Because of its greater surface area in contact with the earth, the casing will be very close in electrical potential to the potential conventionally described as ground, or earth, potential, while the source electrodes potential will be driven relative to that of the casing and the earth by the transmitter. Thus the electrical ground of the transmitter should be established at a physical point in the earth close to the casing, or actually connected to the casing. The positive, and/or negative output voltage of the waveform produced by the transmitter will then be applied to the source electrodes, while the voltages produced by the RDGC at the surface in the immediate vicinity of the well and connected infrastructure will be much smaller, close to zero volts with respect to earth potential, and in no case more than the allowed voltage exposure at the site (e.g. 50 V), so as to avoid hazard to personnel and equipment.

By virtue of not requiring access to the inside of the well, the RDGC invention can be used with wells that are actively functioning to produce hydrocarbons, wells used to inject fluids used as part of producing hydrocarbons, and wells that contain other instrumentation that would otherwise prevent access of a downhole electrode needed for the BSEM and RGC sources. Similarly, operating the RDGC so that the voltage applied at the well is close to earth potential also allows wells to remain fully or partly functional while the survey is being conducted. These two features of the invention are thus of considerable economic benefit. In particular, in contrast to BSEM, they allow the RDGC method to be used for long-term monitoring at a producing well.

The invention can also be used with wells that are temporarily offline, or no longer in service. Indeed a further benefit is because access to the interior of the well is not required, a well that cannot be used for production owing to physical degradation can still be used for the RDGC provided only that the remaining part of the casing can conduct sufficient electricity.

Although described with reference to the preferred embodiments of the invention, it should be readily understood that various changes and/or modifications can be made to the invention without departing from the spirit thereof. In particular, it should be clear that the number of surface electrodes can range significantly, basically from two or more; the surface electrodes are positioned a significant distance from the well bore; the depth of mounting the surface electrodes can vary, basically from a surface mount to just contacting a water table for the region; and the high voltage electrode(s) can actually be established by either the surface electrodes or the casing.

We claim:

1. A system for inducing an electric current at depth within the earth, comprising:
    at least one conductor in electrical contact with the earth and extending to the depth of at least 50 m;
    a plurality of spaced electrodes located at a radial distance offset from the at least one conductor along a surface of the earth by a distance of at least 0.2 times the depth of the at least one conductor; and
    a voltage or current source for providing an output voltage or current of a desired waveform, said source being electrically connected to both the plurality of spaced electrodes and the at least one conductor wherein, upon establishing the output voltage or current, multiple paths of electric current are established within the earth, between each of the plurality of electrodes and the at least one conductor, along a range of depths of the at least one conductor; and
    an array of electromagnetic sensors deployed along the surface over a region of interest of the surface of the earth and in a vicinity of the plurality of electrodes.

2. The system of claim 1, wherein the conductor constitutes production tubing or a casing of a borehole.

3. The system of claim 2, wherein the conductor constitutes a casing and at least part of the casing is oriented substantially horizontally.

4. The system of claim 2, wherein the conductor constitutes a casing and the voltage or current source is indirectly, electrically connected to the casing.

5. The system of claim 2, wherein the conductor constitutes a casing, the voltage or current source is directly, electrically connected to the casing through a cable and the electrical connection from voltage or current source to the casing includes a path through the earth.

6. The system of claim 2, wherein the conductor constitutes a casing and the electrical connection from the voltage or current source to the casing is at a depth of less than 100 m.

7. The system of claim 2, wherein each of the plurality of electrodes is located at a radial distance from the casing of greater than 1 km.

8. The system of claim 2, wherein the plurality of electrodes are located in an approximately circular arc approximately centered on the borehole.

9. The system of claim 2, wherein the array of electromagnetic sensors is deployed at a distance greater than 100 m from the casing in order to measure one or more electromagnetic fields, or one or more components of an electromagnetic field that can be related to the subsurface properties of the earth.

10. The system of claim 1, wherein the conductor is located in an uncased hole.

11. The system of claim 10, wherein the conductor constitutes fluid which fills at least a portion of the uncased hole.

12. A method for inducing electric current at depth within the earth, comprising:
    providing at least one conductor in the form of a casing, in electrical contact with the earth and extending to the depth of at least 50 m;
    spacing a plurality of electrodes a radial distance offset from the at least one conductor along a surface of the earth by a distance of at least 0.2 times the depth of the at least one conductor;
    deploying an array of electromagnetic sensors along the surface over a region of interest of the surface of the earth and in a vicinity of the plurality of electrodes;
    electrically connecting a voltage or current source, for providing an output voltage or current of a desired waveform, to both the plurality of spaced electrodes and the at least one conductor; and
    establishing the output voltage or current of the desired waveform to establish multiple paths of electric current within the earth, between each of the plurality of electrodes and the at least one conductor along a range of depths of the at least one conductor.

13. The method of claim 12, further comprising: holding the casing at close to zero voltage with respect to earth potential.

14. The method of claim 12, further comprising: establishing different paths by switching between electrodes at different distances from the casing.

15. The method of claim 12, wherein the at least one electrode of the plurality of electrodes is positioned at a distance greater than 100 m from the casing in order to measure one or more electromagnetic fields, or one or more components of an electromagnetic field that can be related to subsurface properties of the earth.

16. The method of claim 12, further comprising: inducing the electric current in indicating a physical distribution of water, including water in steam form, hydrocarbons, carbon dioxide, proppants, hydrofracturing fluids, salts, ore bodies, minerals of interest, or environmental pollutants.

17. The method of claim 12 wherein an output of the source is switched between the electrodes at different distances from the casing in order to change an effective depth of the casing.

* * * * *